United States Patent
Tarre et al.

(10) Patent No.: US 10,476,982 B2
(45) Date of Patent: Nov. 12, 2019

(54) MULTI-DATACENTER MESSAGE QUEUE

(71) Applicant: CISCO TECHNOLOGY, INC., San Jose, CA (US)

(72) Inventors: Marc Solanas Tarre, San Jose, CA (US); Ralf Rantzau, San Jose, CA (US); Debojyoti Dutta, Santa Clara, CA (US); Manoj Sharma, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 134 days.

(21) Appl. No.: 15/154,141

(22) Filed: May 13, 2016

(65) Prior Publication Data

US 2016/0337465 A1    Nov. 17, 2016

Related U.S. Application Data

(60) Provisional application No. 62/162,515, filed on May 15, 2015.

(51) Int. Cl.
*H04L 12/861* (2013.01)
*H04L 29/08* (2006.01)
*G06F 9/00* (2006.01)

(52) U.S. Cl.
CPC ............ *H04L 67/2823* (2013.01); *G06F 9/00* (2013.01); *H04L 49/9005* (2013.01)

(58) Field of Classification Search
None
See application file for complete search history.

(56) References Cited

U.S. PATENT DOCUMENTS 5,812,773 A    9/1998    Norin
5,889,896 A    3/1999    Meshinsky et al.
(Continued)

FOREIGN PATENT DOCUMENTS

CN    101719930    6/2010
CN    101394360    7/2011
(Continued)

OTHER PUBLICATIONS

Apache Software Foundation (ASF), "Kafka Mirror Maker," Apache License, Version 2.0, Jan. 2004, 2 pages; https://raw.githubusercontent.com/elodina/go_kafka_client/master/mirrormaker/mirror_maker.go.

(Continued)

*Primary Examiner* — Joshua Joo
(74) *Attorney, Agent, or Firm* — Polsinelli PC

(57) ABSTRACT

Approaches are disclosed for distributing messages across multiple data centers where the data centers do not store messages using a same message queue protocol. In some embodiment, a network element translates messages from a message queue protocol (e.g., Kestrel, RABBITMQ, APACHE Kafka, and ACTIVEMQ) to an application layer messaging protocol (e.g., XMPP, MQTT, WebSocket protocol, or other application layer messaging protocols). In other embodiments, a network element translates messages from an application layer messaging protocol to a message queue protocol. Using the new approaches disclosed herein, data centers communicate using, at least in part, application layer messaging protocols to disconnect the message queue protocols used by the data centers and enable sharing messages between messages queues in the data centers. Consequently, the data centers can share messages regardless of whether the underlying message queue protocols (Continued)

used by the data centers (and the network devices therein) are compatible with one another.

20 Claims, 10 Drawing Sheets

(56) References Cited

U.S. PATENT DOCUMENTS

| | | | |
|---|---|---|---|
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,801,927 B1* | 10/2004 | Smith | H04L 47/10 709/202 |
| 6,996,615 B1 | 2/2006 | McGuire | |
| 7,054,930 B1 | 5/2006 | Cheriton | |
| 7,058,706 B1 | 6/2006 | Iyer et al. | |
| 7,062,571 B1 | 6/2006 | Dale et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,583,665 B1 | 9/2009 | Duncan et al. | |
| 7,606,147 B2 | 10/2009 | Luft et al. | |
| 7,644,437 B2 | 1/2010 | Volpano | |
| 7,647,594 B2 | 1/2010 | Togawa | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,495,725 B2 | 7/2013 | Ahn | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andreis et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,002 B1 | 9/2014 | Dickinson et al. | |
| 8,850,182 B1 | 9/2014 | Fritz et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,352 B1 | 4/2015 | Yee et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,130,846 B1 | 9/2015 | Szabo et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,294,408 B1 | 3/2016 | Dickinson et al. | |
| 9,313,048 B2 | 4/2016 | Chang et al. | |
| 9,361,192 B2 | 6/2016 | Smith et al. | |
| 9,379,982 B1 | 6/2016 | Krishna et al. | |
| 9,380,075 B2 | 6/2016 | He et al. | |
| 9,432,245 B1 | 8/2016 | Sorenson, III et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,571,570 B1 | 2/2017 | Mutnuru | |
| 9,613,078 B2 | 4/2017 | Vermeulen et al. | |
| 9,628,471 B1 | 4/2017 | Sundaram et al. | |
| 9,658,876 B2 | 5/2017 | Chang et al. | |
| 9,692,802 B2 | 6/2017 | Bicket et al. | |
| 9,755,858 B2 | 9/2017 | Bagepalli et al. | |
| 2001/0055303 A1 | 12/2001 | Horton et al. | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0034702 A1 | 2/2004 | He | |
| 2004/0088542 A1 | 5/2004 | Daude et al. | |
| 2004/0095237 A1 | 5/2004 | Chen et al. | |
| 2004/0131059 A1 | 7/2004 | Ayyakad et al. | |
| 2004/0197079 A1 | 10/2004 | Latvala et al. | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2006/0062187 A1 | 3/2006 | Rune | |
| 2006/0104286 A1 | 5/2006 | Cheriton | |
| 2006/0126665 A1 | 6/2006 | Ward et al. | |
| 2006/0146825 A1 | 7/2006 | Hofstaedter et al. | |
| 2006/0155875 A1 | 7/2006 | Cheriton | |
| 2006/0168338 A1 | 7/2006 | Bruegl et al. | |
| 2006/0233106 A1 | 10/2006 | Achlioptas et al. | |
| 2007/0070988 A1* | 3/2007 | Mu | G06Q 10/107 370/352 |
| 2007/0143430 A1* | 6/2007 | Johnson | G06F 9/544 709/206 |
| 2007/0174663 A1 | 7/2007 | Crawford et al. | |
| 2007/0223487 A1 | 9/2007 | Kajekar et al. | |
| 2007/0242830 A1 | 10/2007 | Conrado et al. | |
| 2008/0005293 A1 | 1/2008 | Bhargava et al. | |

(56) References Cited

U.S. PATENT DOCUMENTS

| | | |
|---|---|---|
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0099236 A1* | 4/2011 | Vuong ............... H04L 41/0627 709/206 |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023116 A1* | 1/2012 | Wilkes ............... G06F 17/30427 707/756 |
| 2012/0023418 A1* | 1/2012 | Frields ............... G06Q 10/101 715/756 |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |

(56) References Cited

U.S. PATENT DOCUMENTS

| | | |
|---|---|---|
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156028 A1 | 6/2014 | Subramanian et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215443 A1* | 7/2014 | Voccio ............... G06F 11/3612 |
| | | 717/128 |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0280586 A1* | 9/2014 | Hoffman ............. H04L 65/1006 |
| | | 709/204 |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorensen, III et al. |
| 2014/0310417 A1 | 10/2014 | Sorensen, III et al. |
| 2014/0310418 A1 | 10/2014 | Sorensen, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0026307 A1 | 1/2015 | Van Der Beek |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0237171 A1* | 8/2015 | Li ......................... H04L 67/16 |
| | | 709/217 |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0289123 A1* | 10/2015 | Shatzkamer ........... G06Q 10/06 |
| | | 455/406 |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0300142 A1* | 10/2016 | Feller ..................... G06N 5/04 |
| 2016/0330164 A1* | 11/2016 | Bellan ................... H04L 51/36 |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149715 A1* | 5/2017 | Watte ................... H04L 51/18 |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |

(56) References Cited

FOREIGN PATENT DOCUMENTS

| | | |
|---|---|---|
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Jones, T., "Meet the Extensible Messaging and Presence Protocol (XMPP)," IBM Corporation, Sep. 18, 2009, 11 pages.
Foster, A., "Messaging Technologies for the Industrial Internet and Internet of Things Whitepaper," PrismTech Corp., Version 1.9, May 2015, 26 pages.
Banks, A., "MQTT Version 3.1.1 OASIS Standard," Standards Track Work Product, OASIS Open 2014, Version Oct. 29, 2014, 81 pages; https://docs.oasis-open.org/mott/mott/v3.1.1/os/mott-v3.1.1-os.pdf.
Saint-Andre, P., "Extensible Messaging and Presence Protocol (XMPP): Core," Internet Engineering Task Force (IETF), RFC 6120, Mar. 2011, 211 pages; https://tools.ietf.org/pdf/rfc6120.pdf.
Fette, I., "The WebSocket Protocol," Internet Engineering Task Force (IETF), RFC 6455, Dec. 2011, 71 pages; https://tools.ietf.org/pdf/rfc6455.pdf.
Amedro, Brian, et al., "An Efficient Framework for Running Applications on Clusters, Grids and Cloud," 2010, 17 pages.
Author Unknown, "5 Benefits of a Storage Gateway in the Cloud," Blog, TwinStrata, Inc., Jul. 25, 2012, XP055141645, 4 pages, htttbs://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, a White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, a White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, a White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Css Corp, "Enterprise Cloud Gateway (ECG)—Policy driven framework environments," original published on or about Feb. 11, 2012; 1 page; for managing multi-cloud htto://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kunz, Thomas, et al., "OmniCloud—The Secure and Flexible Use of Cloud Storage Services," 2014, 30 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.

(56) References Cited

OTHER PUBLICATIONS

Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.

* cited by examiner

MULTI-DATACENTER MESSAGE QUEUE

CROSS-REFERENCE TO RELATED APPLICATIONS

This application claims the benefit of priority under 35 U.S.C. § 119(e) to U.S. Provisional Patent Application Ser. No. 62/162,515, entitled "MULTI-DATACENTER MESSAGE QUEUE" filed May 15, 2015, which is hereby incorporated by reference in its entirety.

TECHNICAL FIELD

This disclosure relates in general to the field of communications and, more particularly, to enabling communication between message queues across multiple data centers.

BACKGROUND

Data centers are often the source of many messages. The messages may be messages that are passed between applications or may be system messages (e.g., used to analyze the performance of the data center and/or the devices therein). The messages may be logged and/or stored in a message queue. A message queue protocol may be used to maintain queues of messages and to distribute such messages. In some cases, such messages are copied from one data center to another.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1A:
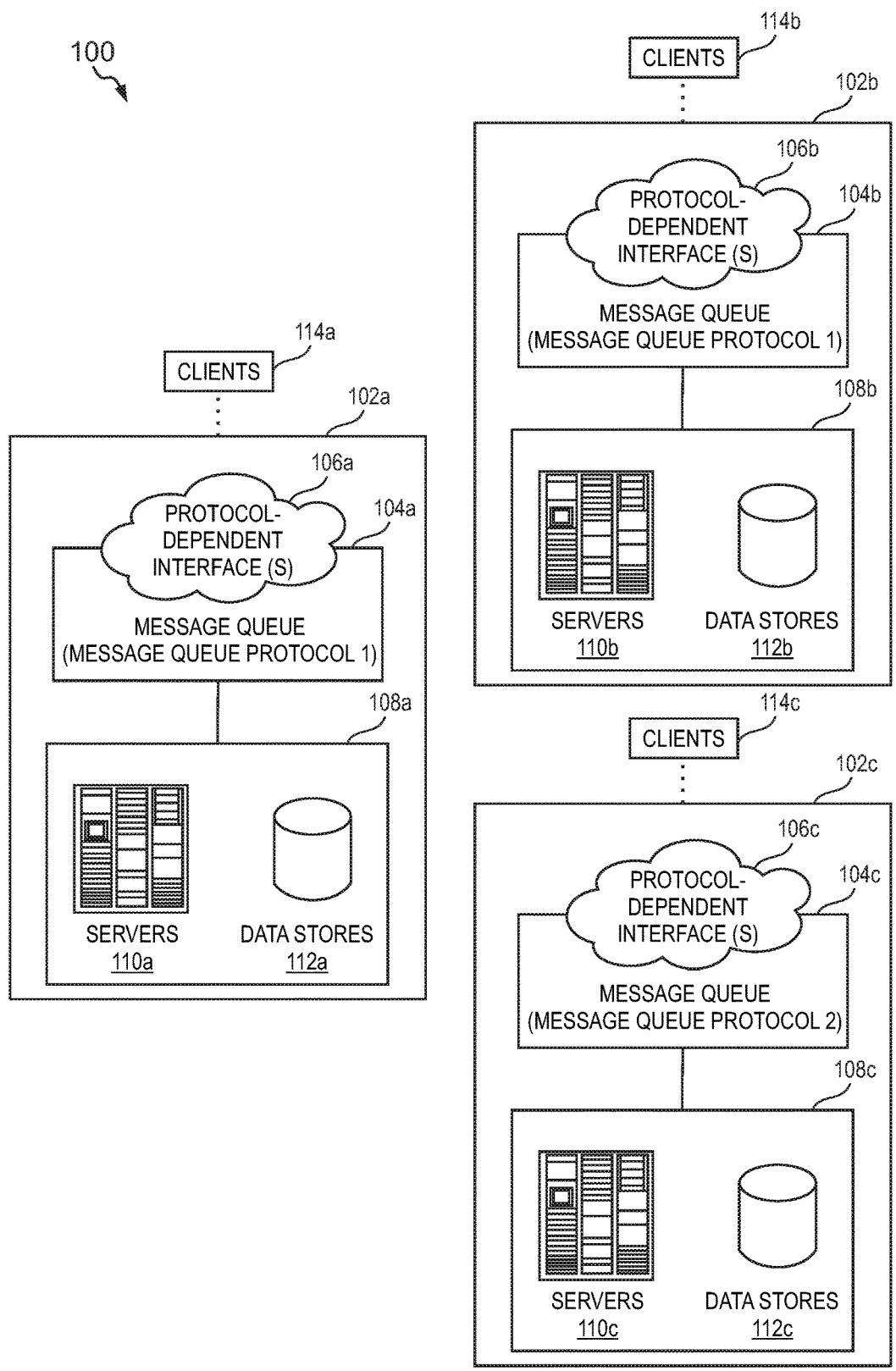
FIG. 1A is a simplified schematic diagram illustrating independent data centers in accordance with some embodiments of the present disclosure.

In some examples a method comprises: receiving from a first message queue, a message encoded in a first message queue protocol associated with the first message queue; generating a translated message by translating the message from the first message queue protocol to an application layer messaging protocol; and transmitting, utilizing the application layer messaging protocol, the translated message to a server, wherein the translated message update a second message queue, the second message queue being encoded in a second message queue protocol.

In other examples, an apparatus comprises: a network interface, the network interface being configured to receive, from a first message queue, a message encoded in a first message queue protocol associated with the first message queue; a memory element to store code; at least one processor coupled to the memory element and network interface, wherein the at least one processor is to execute the code to perform operations comprising: generating a translated message by translating the message from the first message queue protocol to an application layer messaging protocol; and transmitting, utilizing the application layer messaging protocol and the network interface, the translated message to a server, wherein the translated message is to update a second message queue encoded in a second message queue protocol.

In further examples, a computer-readable non-transitory medium comprising instructions, that when executed by at least one processor configure the at least one processor to perform operations comprising: receiving from a first message queue, a message encoded in a first message queue protocol associated with the first message queue; generating a translated message by translating the message from the first message queue protocol to an application layer messaging protocol; and transmitting, utilizing the application layer messaging protocol, the translated message to a server, wherein the translated message update a second message queue, the second message queue being encoded in a second message queue protocol.

In still other examples a method comprises: receiving a message encoded in an application layer messaging protocol; generating a translated message by translating the message from the application layer messaging protocol to a message queue protocol; and transmitting the translated message to a network element storing at least a portion of a message queue.

In other examples, an apparatus comprises: a network interface, the network interface being configured to receive a message encoded in an application layer messaging protocol; a memory element to store code; at least one processor coupled to the memory element and network interface, wherein the at least one processor is to execute the code to perform operations comprising: generating a translated message by translating the message from the application layer messaging protocol to a message queue protocol; and transmitting the translated message to a network element storing at least a portion of a message queue.

In yet other examples, a computer-readable non-transitory medium comprising instructions, that when executed by at least one processor configure the at least one processor to perform operations comprising: receiving a message encoded in an application layer messaging protocol; generating a translated message by translating the message from the application layer messaging protocol to a message queue protocol; and transmitting the translated message to a network element storing at least a portion of a message queue.

Example Embodiments

Turning to FIG. 1A, FIG. 1A is a simplified schematic diagram illustrating a network (i.e., network 100) comprising independent data centers, in accordance with some embodiments of the present disclosure. In particular, FIG. 1A includes one or more data centers (e.g., data centers 102a, 102b, and 102c). Clients 114 (i.e., clients 114a, 114b, and 114c) comprise one or more endpoints operably coupled to each data center. The data centers 102a, 102b, and 102c respectively include corresponding message queues 104a, 104b, and 104c; protocol-dependent interfaces 106a, 106b, and 106c; and one or more network elements 108a, 108b, and 108c. The one or more network elements 108a, 108b, and 108c include servers 110a, 110b, and 110c and data stores 112a, 112b, 112c. Message queue 104a (in data center 102a) is implemented using a first message queue protocol (i.e., "message queue protocol 1"). Message queue 104b (in data center 102b) is implemented using the first message queue protocol (i.e., "message queue protocol 1"). Message queue 104c (in data center 102c) is implemented using a second message queue protocol (i.e., "message queue protocol 2"). In addition, while each data center is illustrated as only a single entity, it be understood by those of skill in the art that each of data centers 108a, 108b, and 108c may comprise a plurality of discrete (and separate) data centers, each of which may comprise a plurality of network element. Any number of data centers, servers, data stores, network elements, or message queues may be connected in each data center without departing from the broad scope of the present disclosure.

As used herein in this Specification, the term 'network element' is meant to encompass any as servers (physical or virtual), end user devices, routers, switches, cable boxes, gateways, bridges, load balancers, firewalls, inline service nodes, proxies, processors, modules, or any other suitable device, component, element, proprietary appliance, or object operable to exchange, receive, and/or transmit data in a network environment. These network elements may include any suitable hardware, software, components, modules, interfaces, or objects that facilitate the sharing of message queue operations thereof. This may be inclusive of appropriate algorithms and communication protocols that allow for the effective exchange of data or information. Each of the network elements can also include suitable network interfaces for receiving, transmitting, and/or otherwise communicating data or information in a network environment.

Within the context of the disclosure, a 'network' represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

A 'message queue' is inclusive of one or more network elements (e.g., 108a-c) that each stores at least a portion of messages corresponding to a queue of messages for a data center. Thus, each message queue can comprise one or more network elements that, collectively, store the messages corresponding to the message queue. Each network element in the message queue stores the messages encoded in a message queue protocol. A 'message queue protocol' is inclusive of protocols for maintaining queues of messages and distributing such messages. A message queue protocol can define a protocol-dependent interface for accessing the message queue. The protocol-dependent interface expose methods (e.g., functions) for adding, removing, and/or otherwise modifying messages stored in a message queue. Examples of message queue protocols include Kestrel, RabbitMQ™ (referred to herein as "RabbitMQ"), Apache™ Kafka (referred to herein as "Kafka)", ActiveMQ™ (referred to herein as "ActiveMQ"). Each network element in a message queue uses the protocol-dependent interface to facilitate adding, removing, and/or otherwise modifying messages stored in the message queue. Because the protocol-dependent interface is protocol-dependent (e.g., is implemented for a the message queue protocol), messages output from the message queue (via the protocol-dependent interface) are encoded in the message queue protocol.

Some message queue protocols distinguish between producers and consumers of messages. A message producer may generate one or more messages. A message consumer may consume one or more messages. A network element may be a producer, a consumer, or both. Message producers may transmit the messages to a broker (or publish the message). A broker is an intermediary network element that facilitates distribution of messages to consumers. In some embodiments of the present disclosure, the broker is a server for distributing messages to message queues in an application layer messaging protocol. Thus, the consumers may receive the message from the broker. The messages may be distributed to consumers in a one-to-one fashion (e.g., where each message is sent to only one consumer) or in a one-to-many fashion (e.g., where each message is sent to more than one consumer).

As a further example, producers and consumers may operate in a publisher-subscriber model, in which one network element or component (i.e., the publisher or producer) is configured to detect an event (e.g., receipt of a message in a message queue). Other network elements or components (i.e., the subscriber or consumer) subscribe to the event and, as subscribers, are notified (e.g., are transmitted a copy of the message) when the publisher detects the event. The subscriber may register directly with the publisher (e.g., by sending a message to the publisher that requests notifications from the publisher) or may register directly with a broker (e.g., by sending, to the broker, a message that requests notifications from the publisher). When the publisher detects the event, the publisher broadcasts the message to all subscribers of the event (in some cases via a broker).

Figure 1B:
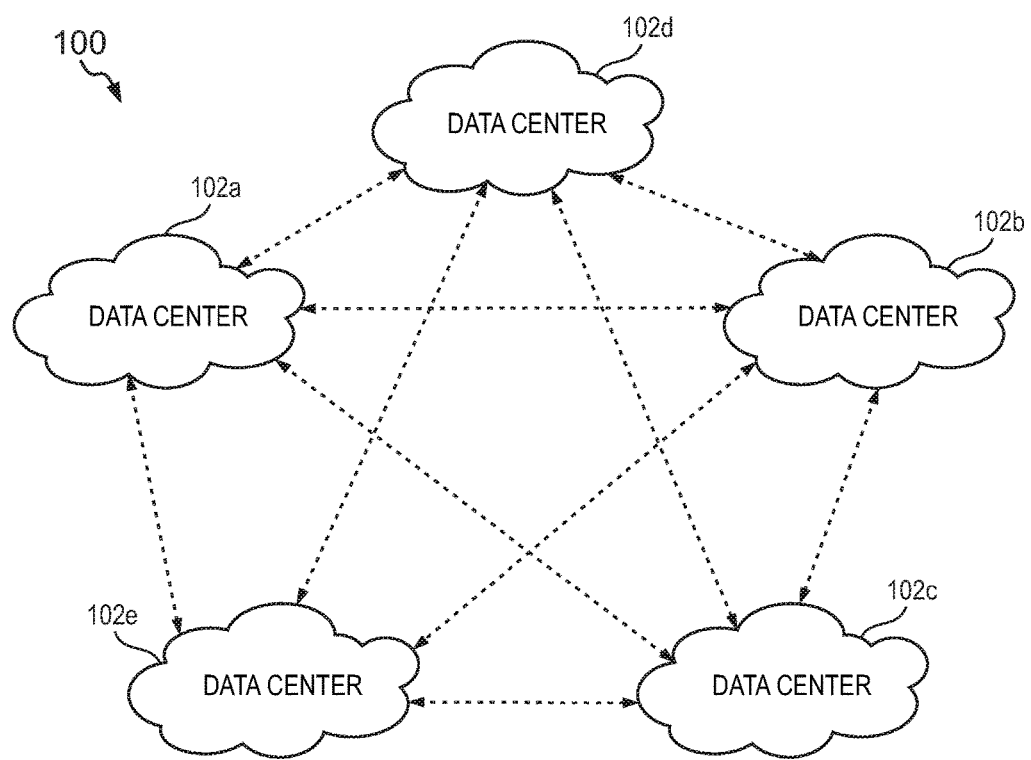
FIG. 1B is a simplified schematic diagram illustrating potential communication channels between the independent data centers of FIG. 1A (and others), in accordance with some embodiments of the present disclosure.

FIG. 1B is a simplified schematic diagram illustrating potential communication channels between the independent data centers in the network 100 of FIG. 1A (and others), in accordance with some embodiments of the present disclosure. The network 100 in FIG. 1B includes five data centers (i.e., data centers 102a-e). Two new data centers are illustrated in the network 100 in FIG. 1B relative to FIG. 1A. The data centers 102a-c in FIG. 1B correspond to data centers 102a-c illustrated in FIG. 1A. The data centers 102d-e in FIG. 1B are new. The network 100 may include any number of data centers. Indeed the systems described herein are readily scalable and, further, can accommodate a large number of data centers, as well as more complicated/sophisticated arrangements and configurations. Accordingly, the examples provided should not limit the scope or inhibit the broad techniques of using various protocols for migration/sharing of message queues, as potentially applied to a myriad of other architectures. While the data centers 102a-e may be distributed (e.g., remotely located with respect to one another), the individual data centers cooperate with one another to share messages.

The dashed lines between the individual data centers 102a-e represent communication channels. As used herein, a 'communication channel' encompasses a physical transmission medium (e.g., a wire) or a logical connection (e.g., a radio channel) used to convey information signals (e.g., data, data packets, control packets, messages etc.) from one or more senders (e.g., a first data center, a first message queue, a message producer, a network element, and the like) to one or more receivers (e.g., a second data center, a second message queue, a message consumer, a network element, and the like). Data, as used herein, refers to any type of source or object code, data structure, any type of numeric, voice, messages, video, media, or script data packet, or any other suitable information in any appropriate format that may be communicated from one point to another. A communication channel, as used herein, can include one or more communication links, which may be physical (e.g., wire) or logical (e.g., data link, wireless link, etc.). Termination points of communication channels can include network interfaces such as Ethernet ports, serial ports, etc. In some examples, each communication channel may be a single channel: deployed for both control messages (i.e., instructions to control a network element) and data messages (i.e., messages that include data packets for transmission to other data centers for sharing message queues). A data center may connect to another data center over a communication channel and/or over a network. These communication channels are used to transmit messages and data between the data centers. The individual data centers may use any communication protocol (e.g., a Transport Layer protocol) for communication over the communication channels.

In some traditional systems, different message queue protocols are not interoperable with one another. In such systems, exchanging messages between the data centers 102a-e as illustrated in FIG. 1B is only possible when each data center implements a same message queue protocol. However, the messages are incompatible when each data center includes a message queue is implemented in a message queue protocol that is different from the message queue protocol used by other data centers (e.g., a first message queue, implemented in a first message queue protocol is incompatible with a second message queue, implemented in a second message queue protocol). Thus, a technical problem to be addressed is how to share messages between message queues that utilize incompatible message queue protocols. Turning again to FIG. 1A, because each of the data centers 102a-c are separate and independent from one another, intercommunication between the data centers is challenging. Thus, any attempt to share messages between message queues (e.g., 104a, 104b, and 104c) in the data centers 102a-c is limited by protocol-dependent interfaces provisioned by each of the message queues. Some traditional systems for sharing message queues fail to enable interoperability between homogenous message queue protocols.

Figure 2:
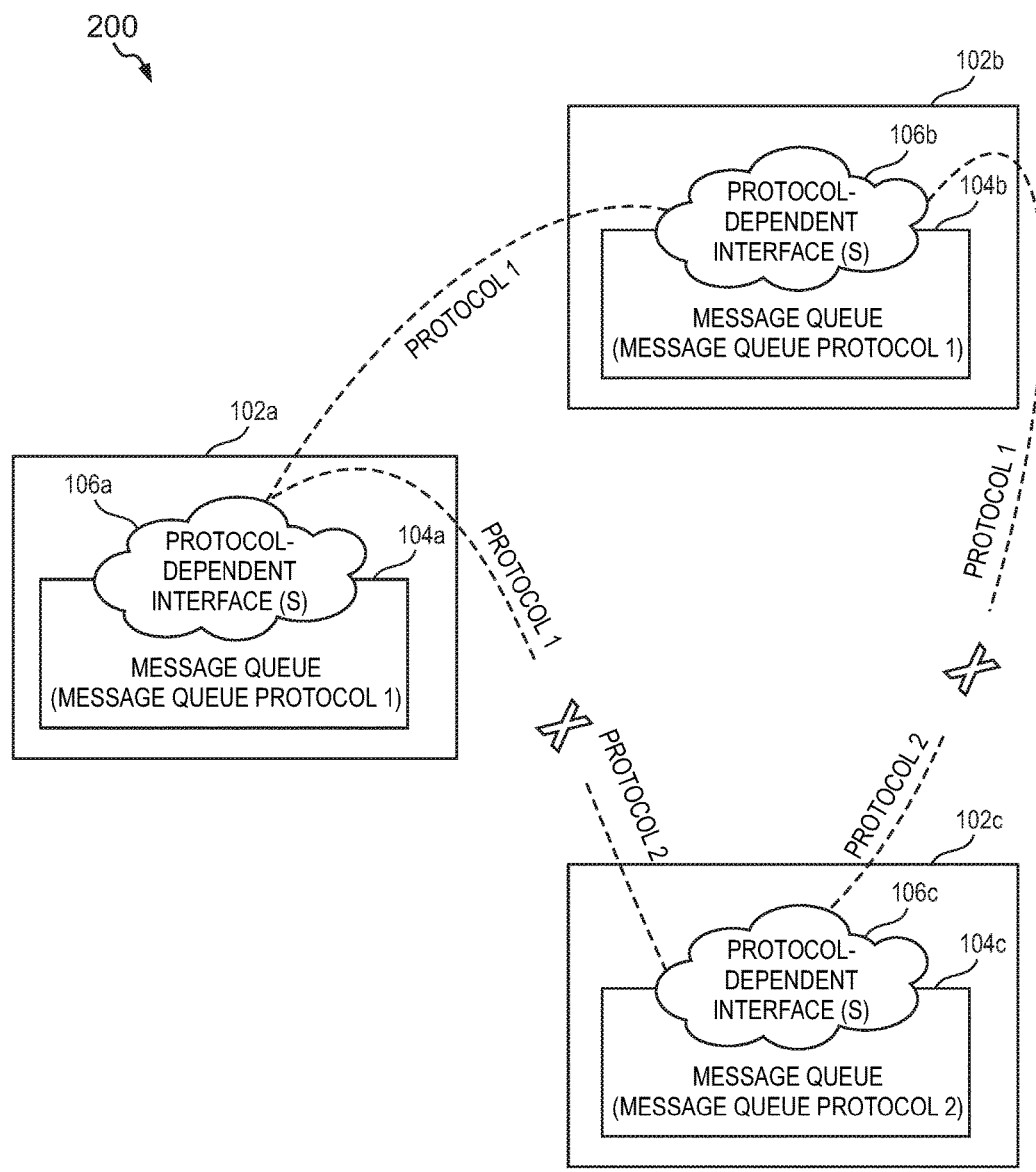
FIG. 2 is a simplified schematic diagram illustrating potential communications between the data centers of FIG. 1A, in accordance with some embodiments of the present disclosure.

Turning to FIG. 2, is a simplified schematic diagram illustrating potential communications between the data centers of FIG. 1A, in accordance with some embodiments of the present disclosure. The components of data centers 102a-c are the same as those illustrated in FIG. 1A and are not repeated here only for the sake of brevity. The system 200 of FIG. 2 illustrates that some systems fail to enable the exchanges of messages from message queues between multiple data centers due, at least in part, to a lack of interoperability between different message queue protocols. A message queue may be stored in a single data center (e.g., to maintain acceptable performance). Thus, when multiple data centers are needed to deploy a system, the message queue may span across the multiple data centers. For example, OpenStack™ Clusters can expand to multiple data centers and, therefore, requires the ability to collect and aggregate messages (and other data) from all of the multiple data centers. This challenge also extends to a more generic use case, where an application is deployed in several locations and real-time (or near real-time) data sharing is required.

A potential solution is to clone one instance of a message queue to across multiple data centers. For example, a message queue can be copied from one data center to each of the other data centers in a system that includes multiple data centers. In the example of Kafka, a mirroring tool for the queue may be used to duplicate queues across multiple data centers. For example, Kafka Mirror Maker can mirror (e.g., copy) messages from one Kafka message queue to another Kafka message queue by using Kafka's producer and consumer roles. In the example of FIG. 2, an attempt is made at exchanging messages from message queues between data centers 102a-c utilizing the corresponding protocol-dependent interfaces 106a-c. Because data centers 102a and 102b implement the same message queue protocol (i.e. "message queue protocol 1"), the data centers 102a and 102b are able to exchange messages from their respective message queues using a common language or protocol (i.e., "PROTOCOL 1"). For example, this may be achieved using data mirroring (e.g., Kafka Mirror Maker). However, data center 102c implements a different message queue protocol (i.e., "message queue protocol 2"), which utilizes a different language or protocol "PROTOCOL 2" and, therefore, is unable to communicate with either of data centers 102a and 102b. In the example of FIG. 2, data centers 102a and 102b are able to share messages from their respective queues with one another using "PROTOCOL 1". However, because data center 102c can only communicate in PROTOCOL 2 and not in PROTOCOL 1, the data center 102c is unable to share messages from its message queues with (or receive shared messages from) either of data centers 102a and 102b. Because the protocol-dependent interfaces 106a-c are dependent on the message queue protocol utilized by the data center, the message queue protocol 2 (i.e., as implemented by data center 102c) is unable to share messages using PROTOCOL 1 (i.e., as required for communication with data centers 102a and 102b). The limitations of using protocol-dependent interfaces (e.g., mirroring, and the like) to exchange messages that it is potentially inefficient (e.g., requiring a series of copies to be transmitted from each data center to each other data center, i.e., an n*n−1 order copy) and requires each data center to use the same message queue protocol.

A solution to address the above issues (and others), disclosed in the present disclosure, provides for intercommunication of messages from message queues having different message queue protocols. The methods, systems, logic, and/or apparatuses (as disclosed herein) address the above technical problem (and others) by enabling messages to be shared between message queues regardless of the message queue protocol utilized by the message queues. In some examples, the methods, systems, logic, and/or apparatuses disclosed herein utilize an application layer messaging protocol to transfer messages between message queues. For example, the application layer messaging protocol may be an Extensible Messaging and Presence Protocol (XMPP), Message Queuing Telemetry Transport (MQTT), WebSocket protocol, or other application layer messaging protocol. The Internet Engineering Task Force (IETF) published, in 2011, Extensible Messaging and Presence Protocol (XMPP) in Request for Comments (RFC) 6120, which is hereby incorporated by reference its entirety. In traditional systems, XMPP is used at the application layer of the OSI model. However, this specification utilizes it at the network layer of the OSI model to transmit messages between data centers. The Organization for the Advancement of Structured Information Standards (OASIS) published, in 2014, MQTT Version 3.1.1, which is hereby incorporated by reference its entirety. The International Organization for Standardization (ISO) published, in 2016, ISO/IEC 20922: 2016, which is a standard that defines MQTT version 3.1.1. The IETF published, in 2011, The WebSocket Protocol in RFC 6455, which is hereby incorporated by reference its entirety. The systems and methods disclosed herein, advantageously, enable exchange of messages between message queues while allowing each of the message queues store messages that are encoded in a different message queue protocol.

Figure 3:
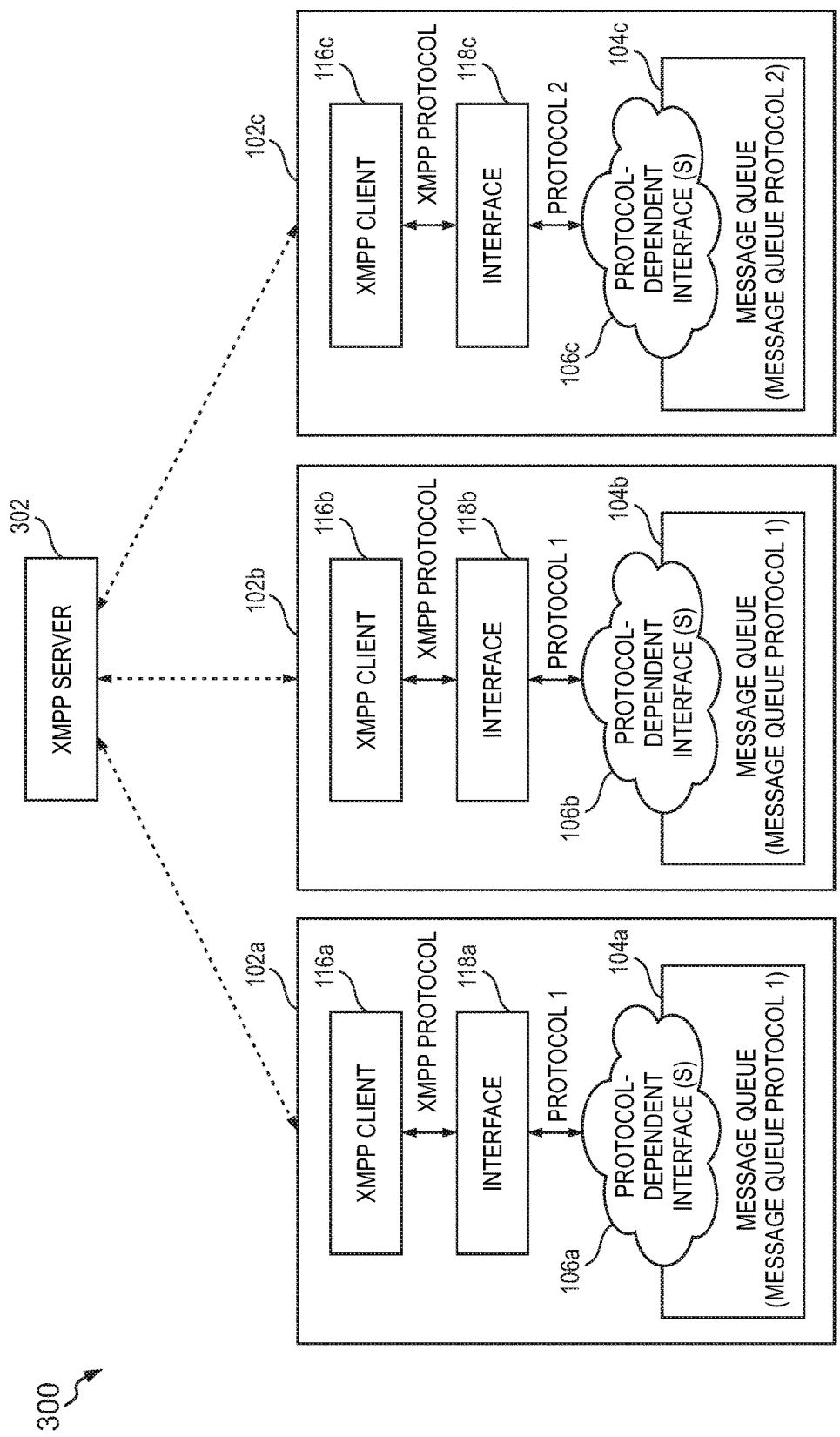
FIG. 3 is a simplified schematic diagram illustrating exemplary communications between data centers utilizing an application layer messaging protocol, in accordance with some embodiments of the present disclosure.

Turning to FIG. 3, FIG. 3 is a simplified schematic diagram illustrating system 300 in which messages are transmitted between message queues in data centers utilizing an application layer messaging protocol. Many of the components of data centers 102a-c in FIG. 3 (system 300) are the same as those illustrated in FIG. 1A (system 100) and are not repeated here only for the sake of brevity. Note that although network elements 108a-c are not depicted in FIG. 3 (only for clarity of the Figure), they are still present in each of the respective data centers 102a-c. In the example, of FIG. 3, the application layer messaging protocol is XMPP.

In system 300, each of the data centers 102a-c contains a corresponding message queue 104a-c. Each of the message queues uses a corresponding message queue protocol for, among other things, modifying the message queue and storing messages in the message queue. Each of the message queues utilizes a corresponding one of the protocol-dependent interfaces 106a-c, respectively. In addition, each of the data centers 102a-c includes an XMPP client 116a-c and interfaces 118a-c, respectively. Each of the XMPP clients 116a-c is configured to communicate with an XMPP agent that is located in the XMPP server 302. The XMPP clients 116a-c are used to interpret messages sent to each message queue 104a-c by the XMPP server 302. The XMPP client can send messages to all the other clients subscribed to receive such messages via the XMPP server 302. The XMPP server 302 may include a XMPP agent, which corresponds to the XMPP clients 116a-c in the data centers 102a-c. The XMPP agent in the XMPP server 302 and the XMPP clients 116a-c in the data centers 102a-c are inclusive of, e.g., code that includes instructions for exchanging messages encoded in XMPP. The connection between the XMPP clients 116a-c and the XMPP agent on the XMPP server 302 is a secure connection (in contrast to unsecure connections that may be provisioned in message queue protocols such as Kafka). Each of the interfaces 118a-c is operable to, among other things, convert a message from a first encoding (e.g., message queue protocol) to a second encoding (e.g., an application layer messaging protocol) and vice versa. In this example, each of the interfaces 118a-c is to convert messages from a message queue protocol to XMPP for transmission to the XMPP server 302. Such conversion by the interfaces 118a-c allows the use of different message queue protocols in each data center while enabling each data center to exchange messages in a format that is compatible with other data centers.

A difference between systems 300 and 100 is that system 300 includes an XMPP server 302 while system 100 does not. The XMPP server 302 transmits messages received from one data center to one or more other data centers. Another difference is that, in system 300, each of the data centers 102a-c includes an XMPP client 116a-c and an interface 118a-c (respectively) while those in system 100 do not. In a broad sense, FIG. 3 illustrates that each data center can implement a message queue using a different message queue protocol (relative to the other data centers) while using the XMPP client to exchanges messages via the XMPP server.

In some examples, data may be mirrored (e.g., using XMPP) from a production data center to an analytics data center (wherein the production data center and the analytics data center use a different message queue protocols). The analytics data center may use a set of technologies for high efficiency data processing.

In operation, the data centers 102a-c exchange messages with the XMPP server 302 using alternate message encodings. The message queue 104a may transmit a message to the interface 118a via protocol-dependent interface 106a. The interface 118a receives the message from the protocol-dependent interface 106a. Because the messages are received using the protocol-dependent interface 106a (i.e., which is dependent upon the message queue protocol), the message is encoding in the message queue protocol associated with the message queue 104am (i.e., PROTOCOL 1). The interface 118a translates the message from the message queue protocol associated with the message queue 104a (PROTOCOL 1) to an alternate encoding to generate a translated message. The alternate encoding may be based on XMPP, MQTT, WebSocket, or other application layer messaging protocols. In this example, the interface 118a translates the message from the PROTOCOL 1 to XMPP to generate the translated message. The interface 118a transmits the translated message to the XMPP client 116a. The XMPP client 116a receives the translated message from the interface 118a and encrypts the translated message to generate an encrypted message (i.e. an encrypted version of the translated message). The XMPP client 116a transmits, utilizing at least in part the application layer messaging protocol, the encrypted message to an XMPP agent on the XMPP server 302. Advantageously, the application layer messaging protocol is used to facilitate a publisher-subscriber relationship between message queues. The XMPP server 302 uses the encrypted message to update at least one other message queue in at least one other data center. For example, the XMPP server 302 receives the encrypted message from data center 102a (e.g., from message queue 104a is associated with message protocol 1) and uses it to update the message queue 104c in data center 102c, which stores messages in a different message queue protocol than message queue 104a. The XMPP server 302 may determine (e.g., based on a table storing a correspondence between message producers and subscribers) that the encrypted message is to be transmitted to the data center 102c. The XMPP agent on the XMPP server 302 transmits the encrypted message (received from the XMPP client 116a in the data center 102a) to the XMPP client 116c in the data center 102c. The XMPP client 116c receives the encrypted message from the XMPP agent on the XMPP server 302 and decrypts the encrypted message to generate the original translated message (encoded in XMPP, which was generated by the interface 118a in date center 102a). The XMPP client 116c transmits the translated message to the interface 118c. The interface 118c receives the translated message from the XMPP client 116c. The interface 118c translates the message from XMPP to the PROTOCOL 2. The interface 118c utilizes the protocol-dependent interface 104c to insert the message (now encoded in a message queue protocol, PROTOCOL 2) into the message queue 104c. Because the interfaces 118a-c and the server 302 exchanges messages in alternate message encoding (e.g., application layer messaging protocol, XMPP, MQTT, WebSocket, and the like), the process of exchanges of messages between multiple data centers message is agnostic with respect to the underlying message protocol used by the data centers.

Is noted that the XMPP server 302 may also maintain a local message queue and/or buffer for the message queue. Advantageously, because XMPP is used distribute and/or publish messages to the data centers 102a-c, to local message queue in the XMPP server 302 may be implemented using any message queue protocol (e.g., where XMPP is again used to as an intermediary protocol between the message queue protocol). This, advantageously, provides a seamless way of distributing messages from different message queues regardless of the message queue protocols underlying the message queues. In the example system 300, each of data centers 102a and 102a implement a first message protocol "message queue protocol 1" while data center 102c implements a second message protocol "message queue protocol 2," which is different from the first. Because each of the data centers translates a local message queue protocol to XMPP, each is able to share messages between the others using XMPP (i.e., via XMPP server 302).

In one example, message queue protocol 1 (PROTOCOL 1) is Kafka and message queue protocol 2 (PROTOCOL 2) is RabbitMQ. In such an example, Kafka may be utilized to analyze time series data (e.g., a set of event (messages) ordered in a time sequence). Kafka may be utilized to deliver a window of data to other data centers (e.g., from data center 102a to data center 102c). Such a window of data may correspond to a state of an analytics application (e.g., data over last X mins, last Y messages, over Z hours). Data center 102a may utilize Kafka to transmit and/or receive different windows of data to different subscribers and/or to analyze such data. For example, XMPP may be utilized to synchronize data from data center 102c (e.g., mirror data from data center 102c to data center 102a via XMPP server 302). After receiving the mirror data from the data center 102c via the server 302, the data center 102a may utilize Kafka to analyze the data. A result of the analysis (e.g., analysis regarding a window of time) may be and transmitted back to data center 102c using utilizing XMPP, as described herein. For example, the XMPP client 116a may translate the result from a Kafka message encoding to an XMPP message encoding for transmission back to the data center 102c.

In a further example, the data center 102a (a first data center) may be located in California. An endpoint generates a message, for example, using a social media application (e.g., TWITTER, FACEBOOK, etc.). The endpoint transmits the message to the message queue 104a (a first message queue) in the first data center, which stores the message in Kafka encoding (the Kafka message). The Kafka message is sent from the first message queue to the interface (118a) in the first data center, which translates the Kafka message to XMPP message encoding (the XMPP message). The interface 118a then forwards the XMPP message to the XMPP client 116a. The XMPP client 116a encrypts the XMPP message and transmits the encrypted XMPP message to the XMPP server 302. The XMPP server 302 can then forward the encrypted XMPP message to any number of other servers or propagate it to any number of XMPP clients (e.g., XMPP clients in any of data centers 102b and/or 102c). For example, the XMPP server 302 may send the encrypted XMPP message to the data centers 102b and 102c. The data center 102c (a third data center) may be located in Texas. A XMPP client 116c receives the encrypted XMPP message from the XMPP server 302. The XMPP client 116c decrypts the encrypted XMPP message, e.g., reconstruct to the original (unencrypted) XMPP message. The XMPP client 116c transmits the XMPP message to the interface 118c in the third data center. The message queue protocol of the message queue 104c may be RabbitMQ. Thus, the interface 118c translates the XMPP message encoding to a RabbitMQ message encoding. The interface 118c inserts the RabbitMQ message into the message queue 104c using the protocol-dependent interface 106c. Finally, an endpoint in Texas retrieves the RabbitMQ message from the message queue 104c and generates if for display in a news feed of the social media application. The data center 102b (a second data center) may be located in Michigan. Though the data center 102b uses the same underlying message queue protocol as the data center 102a, a process similar to that described for the data center 102c may occur for the data center 102b. In other examples, the data center 102a and 102b avoid using the XMPP when exchanging message with one another based on a determination (by a network element in one or both data centers) that each uses the same underlying message queue protocol.

Additionally, it should be noted that the example of FIG. 3, is described in terms of three data centers. However, this has been done for purposes of clarity and example only. In certain cases, it is easier to describe one or more of the functionalities of a given set of flows by only referencing a limited number of data center. It should be appreciated that the system 300 is readily scalable and, further, can accommodate a large number of data centers, as well as more complicated/sophisticated arrangements and configurations of data centers. For example, the system 300 may include four, five, six, or n number of data centers (i.e., where n is an integer greater than zero).

Figure 4:
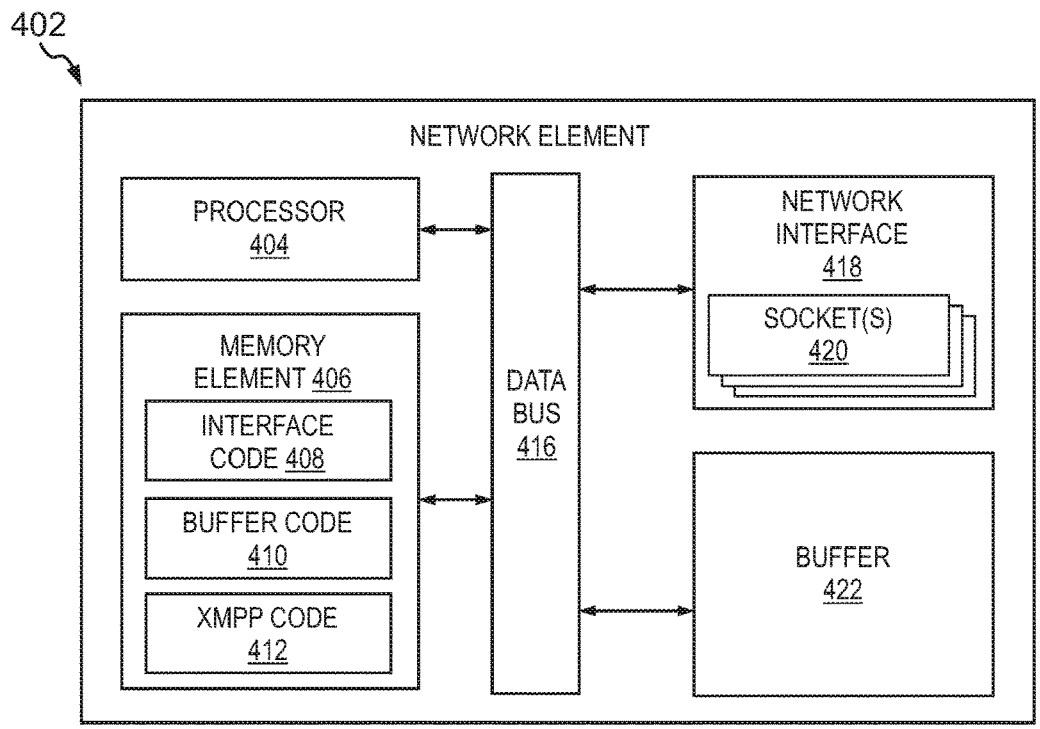
FIG. 4 is a simplified schematic diagram illustrating an exemplary network element for communicating in both a message queue protocol and an application layer messaging protocol, in accordance with some embodiments of the present disclosure.

FIG. 4 is a simplified schematic diagram illustrating an exemplary network element (i.e., network element 402, which is an apparatus) for communicating in both a message queue protocol and an application layer messaging protocol according to some embodiments of the present disclosure. The network element 402 is an example of a network element in any one or more of the data centers 102a-c of FIG. 3. In this example, the network element 402 comprises XMPP code (e.g., XMPP code 412) and interface code (e.g., interface code 408) that correspond to the XMPP clients 116a-c and the interfaces 118a-c respectively of FIG. 3. The network element uses such code to communicate with other network elements (e.g., located in the same data center) that queue messages in a message queue protocol and to communicate with servers (e.g., located outside of the data center) that queue messages in an application layer messaging protocol. Using the new approach disclosed herein, the network element 402 uses, at least in part, the interface to disconnect the message queue protocol used by the other network elements located in the same data center from other message queue protocols used by other data centers. The network element 402 can convert messages from a (native) message queue protocol to an application-layer messaging protocol that allows interoperability with other message queue protocols. Because the application-layer messaging protocol can be used by a system for distributing messages between various data center, such a system is advantageously agnostic with respect to the underlying message queue protocols used by the data centers (and the network devices therein). For example, the network element 402 can translate messages from a message queue protocol to XMPP and relay it to a server for publishing to many other data centers, even in cases where the other data centers use underlying message queue protocols that are different from the one used by the network element 402.

The network element 402 comprises a processor 404, a memory element 406, a data bus 416, a network interface 418, and a buffer 422. The memory element 406 includes an interface code 408, a buffer code 410, and a XMPP code 412. The processor 404, among other things, executes the interface code 408, the buffer code 410, and/or the XMPP code 412 to buffer messages, to translate messages from a message queue protocol to an application layer messaging protocol, and/or to translate messages from the application layer messaging protocol to the message queue protocol. The interface code 408 includes instructions for translating messages between a message queue protocol and an application layer messaging protocol. The interface code 408 also includes instructions for managing the insertion of messages in various message queues (e.g., message queues in other network elements in the data center and/or message queues in a server). For example, the interface code 408 may include instructions for utilizing a protocol-dependent interface of a message queue. The buffer code 410 includes instructions for managing a size and usage of the buffer 422. In some examples, the buffer code 410 dynamically changes the size of the buffer 422 based on The XMPP code 412 includes instructions for exchanging XMPP messages with a XMPP agent on another device (e.g., a server including an XMPP agent). The data bus 416 operably couples the components to one another. The network interface 418 includes a plurality of sockets 420 (e.g., network ports), each of which is configured to transmit and/or receive data over a network. The buffer 422 is operable to store messages. In particular, the buffer 422 is to buffer messages between message queues in the data center and message queues in a (broker) server remote from the data center.

In operation, the network element 402 communicates with a message queue (e.g., a network element storing at least a portion of the message queue) and with a server. The network element 402 may receive messages from the message queue and transmit them to the server. The message queue includes a protocol-dependent interface, which can provide the network element 402 with access to messages in the message queue. For example, the network element 402 uses the protocol-dependent interface to receive (and/or retrieve) via the network interface 418 messages from the message queue. Because the protocol-dependent interface is protocol-dependent (e.g., is implemented for a specific message queue protocol), messages retrieved from the message queue (via the protocol-dependent interface) are encoded in the specific message queue protocol. The network element 402 uses the interface code 408 to translate the message from the specific message queue protocol to the application-layer messaging protocol for communicating with the server. The network element 402 transmits the translated message to the server and, thereby, inserts the message into an application-layer messaging message queue on the server. The interface code 408 may include instructions that, when executed by the processor 404, carry out logic 600 (described below with respect to FIG. 6) to transmit the message to a server. Likewise, the network element 402 may receive messages from the server and add them to the message queue. The XMPP code 412 is used to receive (and/or retrieve) via the network interface 418 messages from the server. Message received from the server are encoded in the application-layer messaging protocol. The network element 402 uses the interface code 408 to translate the messages from the application-layer messaging protocol to the specific message queue protocol. The network element 402 can also use the interface code 408 to generate instructions encoded in the message queue protocol for inserting the translated message into the message queue (using the protocol-dependent interface). The interface code 408 may include instructions that, when executed by the processor 404, carry out logic 700 (described below with respect to FIG. 7) to insert the messages into the message queue in the data center.

In addition, the network element 402 may buffer messages before inserting them into a message queue in the data center or a message queue on the server. The network element 402 uses the buffer code 410 to dynamically change the size of the buffer 422 based on parameters associated with another network element to and/or from which messages are transferred. For example, the parameters may include CPU usage (e.g., where the buffer 422 is increased if the CPU usage of the another network element is elevated above a certain threshold, e.g., to buffer message in the event that the another network element fails/crashes), memory (e.g., where the buffer 422 is adjusted based on the available memory on the device such as the buffer 422 being increased in the available memory is below a threshold), disk (if the system flushes to disk), network congestion, whether a connection is available from to another device and/or based on events detected at other network element remote from the network element 402. In each case, the buffer 422 may be resized to a previous (or default) size when the parameter(s) that caused the change in the buffer size is not longer detected. The buffer code 410 may include instructions that, when executed by the processor 404, carry out logic 900 (described below with respect to FIG. 9) to buffer one or more messages (received from in message queue in the data center) before sending them to the server. In other examples, the network element 402 may buffer one or more messages (received from the server) before sending it to a message queue in the data center.

Figure 5:
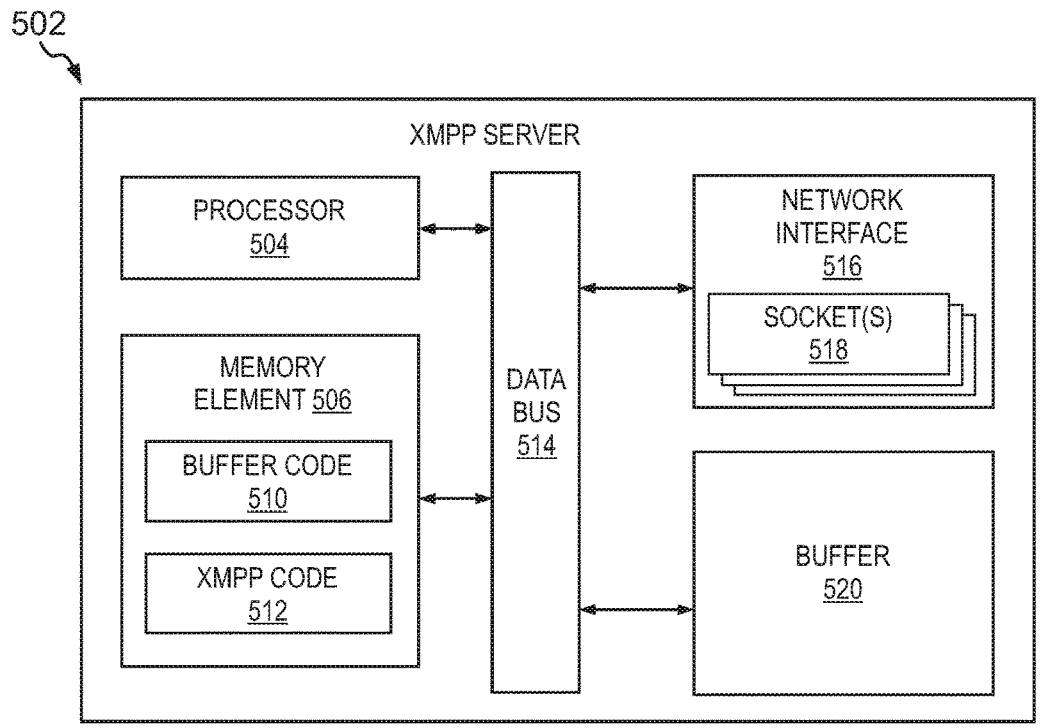
FIG. 5 is a simplified schematic diagram illustrating a server for distributing messages to message queues in an application layer messaging protocol, in accordance with some embodiments of the present disclosure.

FIG. 5 is a simplified schematic diagram illustrating a server (i.e., server 502, which is an apparatus) for distributing messages to message queues in an application layer messaging protocol communication according to some embodiments of the present disclosure. The server 502 is an example of the XMPP server 302 of FIG. 3. In this example, the server 502 comprises XMPP code (e.g., XMPP code 512) and uses such code to communicate with network elements, each of which may queue messages in different message queue protocols. Using the new approach disclosed herein, the server 502 and the network elements communicate using, at least in part, XMPP to disconnect the different message queue protocols and enable communication (message sharing publishing) between messages queues in multiple data centers. Consequently, the server 502 is agnostic with respect to the underlying message queue protocols used by the data centers (and the network devices therein). For example, the server 502 can use XMPP to publish messages received from one data center to many other data centers, even in cases where the other data centers use underlying message queue protocols that are different from the one in which the message was originally encoded (and may be different from one another). Messages are translated to XMPP by the network element prior to being transmitted to the server 502. Thus, the server 502 lacks the interface code 408 of the network element 402 of FIG. 4.

The server 502 comprises a processor 504, a memory element 506, a data bus 514, a network interface 516, and a buffer 520. The memory element 506 includes a buffer code 510 and a XMPP code 512. The processor 504, among other things, executes the buffer code 510 and/or the XMPP code 512 to buffer messages and to distribute messages from one data center to one or more other data centers. The buffer code 510 includes instructions for managing a size and usage of the buffer 520. In some examples, the buffer code 510 dynamically changes the size of the buffer 520 based on parameters associated with network elements to and/or from which messages are transferred. The XMPP code 512 includes instructions for transferring XMPP messages with a XMPP client on another device (e.g., a network element including the XMPP client). The data bus 514 operably couples the components to one another. The network interface 516 includes a plurality of sockets 518 (e.g., network ports), each of which is configured to transmit and/or receive data over a network. The buffer 520 is operable to store messages. In particular, the buffer 520 is to buffer messages in the server 502 based on connectivity to and/or events detected at a message queue (i.e., a network element storing at least a portion of the message queue).

In operation, the server 502 indirectly communicates with a plurality of message queues (e.g., each being a network element storing at least a portion of the plurality of message queues). The server 502 may receive messages from one of the plurality of message queues and transmit (e.g., publish or broadcast) them to others of the plurality of message queues (e.g., others that are subscribers). As described above, each message queue includes a protocol-dependent interface that exposes methods (e.g., functions) for adding, removing, and/or otherwise modifying content of the message queue. However, the server 502 does not communicate with the message queue (i.e., network element storing at least the portion of the message queue) using the message queue protocol or the protocol-dependent interface. Instead, the server 502 is a broker that uses, at least in part, XMPP to publish messages to other network elements in other data centers (e.g., network element 402), which in turn translates the messages for insertion into message queues. The server 502 uses the XMPP code 512 to receive messages (i.e., having been translated to from a message queue protocol to XMPP). The server may then access a data structure that stores a correspondence between publishers and subscribers to determine (e.g., based on a network address of the source and/or destination of the message) which subscribers to which the message should be transmitted. The server 502 uses the XMPP code 512 to transmit the messages (encoded in XMPP) to the subscribers, which can include other data centers that store messages encoded in various message queue protocols. The XMPP code 512 may encrypt the XMPP messages prior to transmission to each data center. The messages encoded in XMPP are received, in each data center, by a network element that includes an XMPP client (e.g., network element 402 of FIG. 4).

In addition, the server 502 may buffer messages before transmitting them to a data center (i.e., to a network element within the data center). The server 502 may utilize the buffer code 510 to dynamically change the size of the buffer 520 based on parameters associated with network elements to and/or from which messages are transferred. For example, the parameters may include CPU usage (e.g., where the buffer 520 is increased if the CPU usage of the network element is elevated above a certain threshold, e.g., to buffer message in the event that the network element fails/crashes), memory (e.g., where the buffer 520 is adjusted based on the available memory on the network element such as the buffer 520 being increased in the available memory is below a threshold), disk (if the system flushes to disk), network congestion, whether a connection is available from/to the network element and/or based on events detected at the network element remote from the server 502. In each case, the buffer 520 may be resized to a previous (or default) size when the parameter(s) that caused the change in the buffer size is not longer detected. In some examples, the buffer code 510 may include instructions that, when executed by the processor 504, carry out logic 800 (described below with respect to FIG. 8) to buffer one or more messages (received from a message queue) before sending them to message queues in other data centers. The server 502 may transmit, to the other data centers, a notification that the data center is unreachable (e.g., connection is unavailable to the data center) to prevent the other data centers sending messages destined for the data center. Such a notification may also cause each of the other data centers to buffer some messages that would, otherwise, be sent to the data center (e.g., where each of the other data centers increases a local buffer size to accommodate the messages). In other examples, the server and the other data center may each buffer a portion of the messages for the data center that is unreachable (e.g., coordinating which portion of the messages will be buffered in the server versus the data centers).

In one implementation, message queues, network elements, servers (e.g., XMPP servers), clients (e.g., XMPP clients), and/or interfaces described herein may include software to achieve (or to foster) the functions discussed herein for enabling migration of message queues where the software is executed on one or more processors to carry out the functions. This could include the implementation of instances of XMPP agents, XMPP clients, interfaces, and message queue protocols and/or any other suitable element that would foster the activities discussed herein. Additionally, each of these elements can have an internal structure (e.g., a processor, a memory element, etc.) to facilitate some of the operations described herein. In other embodiments, these functions for migration of message queues may be executed externally to these elements, or included in some other network element to achieve the intended functionality. Alternatively, XMPP servers, network elements, message queues, and/or interfaces may include software (or reciprocating software) that can coordinate with other network elements in order to achieve the migration of message queues functions described herein. In still other embodiments, one or several devices may include any suitable algorithms, hardware, software, components, modules, interfaces, or objects that facilitate the operations thereof.

In certain example implementations, the migration/sharing of message queues functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases (mapping various protocols to XMPP protocol and/or mapping publishers to subscribers) to enable migration/sharing of message queues as disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of the devices disclosed herein (e.g., the network elements, endpoints, etc.) can include memory elements for storing information to be used in achieving the migration/sharing of message queues, as outlined herein. Additionally, each of these devices may include a processor that can execute software or an algorithm to perform the activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Figure 6:
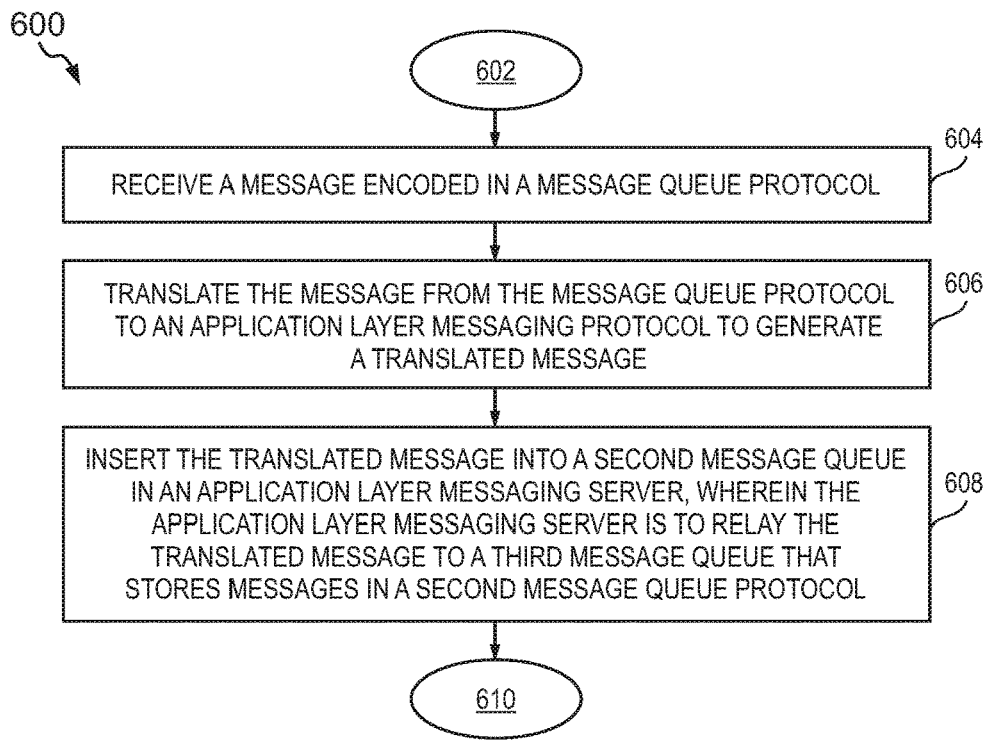
FIG. 6 is a simplified schematic diagram illustrating an exemplary logic for communicating in both a message queue protocol and an application layer messaging protocol, in accordance with some embodiments of the present disclosure.

FIG. 6 is a simplified schematic diagram illustrating an exemplary logic (i.e., logic 600) for communicating in both a message queue protocol and an application layer messaging protocol according to some embodiments of the present disclosure. Procedure 602 may coincide with a start or end point of other logic, routines, and/or applications. In addition, at 602, data (e.g., data structures, objects, values, variables, etc.) may be initialized, retrieved, or accessed for use in logic 600. At 604, a message is received. The message may be received from a message queue. The message is encoded in a message queue protocol. For example, Kestrel, RabbitMQ, Kafka, ActiveMQ, or any message queue protocol may be used. At 606, the message is translated from the message queue protocol to an application layer messaging protocol to generate a translated message. For example, the message may be translated to a XMPP, MQTT, WebSocket protocol, or other application layer messaging protocol. At 608, the translated message is inserted into a second message queue in an application-layer messaging server. The application-layer messaging server is to relay the translated message to a third message queue that stores messages in a second message queue protocol. For example, the application-layer messaging server may locally store the messages in a queue in the application-layer messaging protocol. The application-layer messaging server may publish the messages to other network elements that translate the messages to and store them in a specific message queue protocol. Each of the XMPP server 302 of FIG. 3 and the XMPP server 502 of FIG. 5 is an example of an application-layer messaging server. The logic 600 ends at 610. 610 may coincide with a start or end point of other logic, routines, and/or applications.

At a high level, the logic 600 may be used to translate a message from a message queue protocol to an application-layer messaging protocol. Logic 600 may be implemented in a network element in any of data centers 102a-c (of FIG. 3), network element 402 (of FIG. 4), network element 1002 (of FIGS. 10A and 10B), and/or network element 1006 (of FIGS. 10A and 10B). For example, a processor (in one or more of the network elements 1002 and 1006 of FIGS. 10A and 10B) may execute logic 600 to translate messages from a particular message queue encoding to an application-layer messaging protocol. As another example, the processor 404 (in network element 402 of FIG. 4) may execute logic 600 to translate messages from a particular message queue encoding to an application-layer messaging protocol. Advantageously, the network elements can use the logic 600 to enable an exchange of messages across multiple data centers (by transmitting messages to a central server), even when the data centers do not store messages using a same message queue protocol.

Figure 7:
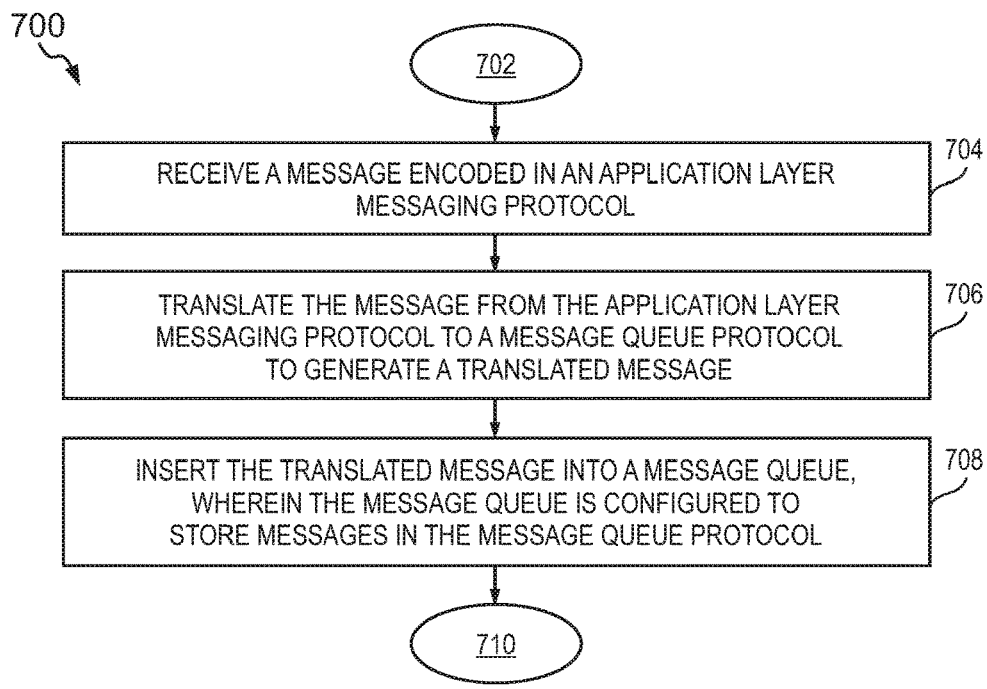
FIG. 7 is a simplified schematic diagram illustrating another exemplary logic for communicating in both a message queue protocol and an application layer messaging protocol, in accordance with some embodiments of the present disclosure.

FIG. 7 is a simplified schematic diagram illustrating an exemplary logic (i.e., logic 700) for distributing messages to message queues in an application layer messaging protocol communication according to some embodiments of the present disclosure. Procedure 702 may coincide with a start or end point of other logic, routines, and/or applications. In addition, at 702, data (e.g., data structures, objects, values, variables, etc.) may be initialized, retrieved, or accessed for use in logic 700. At 704, a message is received; the message is encoded in an application layer messaging protocol. For example, the message may be encoded in XMPP, MQTT, WebSocket protocol, or any other application layer messaging protocol. The message may be received from a server that used an application-layer messaging agent (e.g., XMPP code 512 of FIG. 5) to transmit the message (encoded in the application layer messaging protocol) to several subscribers associated with the message. In some examples, the message is encrypted and may be decrypted before advancing to 706. At 706, the message is translated from the application layer messaging protocol to a message queue protocol to generate a translated message. For example, the message may be translated to Kestrel, RabbitMQ, Kafka, ActiveMQ, or any other message queue protocol. At 708, the translated message is inserted into a message queue. The message queue is configured to stores messages in the message queue protocol. For example, the message queue may be a network element in a data center that locally stores a portion of the message queue in the message queue protocol. In some examples, a protocol-dependent interface associated with the message queue may be utilized to insert the message into the message queue. The logic 700 ends at 710. 710 may coincide with a start or end point of other logic, routines, and/or applications. For example, a single network element may execute logic 600 and logic 700 to facilitate transmission of messages to and receipt of messages from a server and/or to facilitate transmission of messages to and receipt of messages from a message queue. In such an example, the start end of the logic 600 and logic 700 may coincide.

At a high level, the logic 700 may be used to translate a message from an application-layer messaging protocol to a message queue protocol. Logic 700 may be implemented in a network element in any of data centers 102a-c (of FIG. 3), network element 402 (of FIG. 4), network element 1002 (of FIGS. 10A and 10B), and/or network element 1006 (of FIGS. 10A and 10B). For example, a processor (in one or more of the network elements 1002 and 1006 of FIGS. 10A and 10B) may execute logic 600 to translate messages from an application-layer messaging protocol to a particular message queue encoding. As another example, the processor 404 (in network element 402 of FIG. 4) may execute logic 700 to translate messages from an application-layer messaging protocol to a particular message queue encoding. Advantageously, a network element can use the logic 600 to enable an exchange of messages across multiple data centers (by receiving messages from a central server and inserting them into message queues in the data centers), even when the data centers do not store messages using a same message queue protocol.

Figure 8:
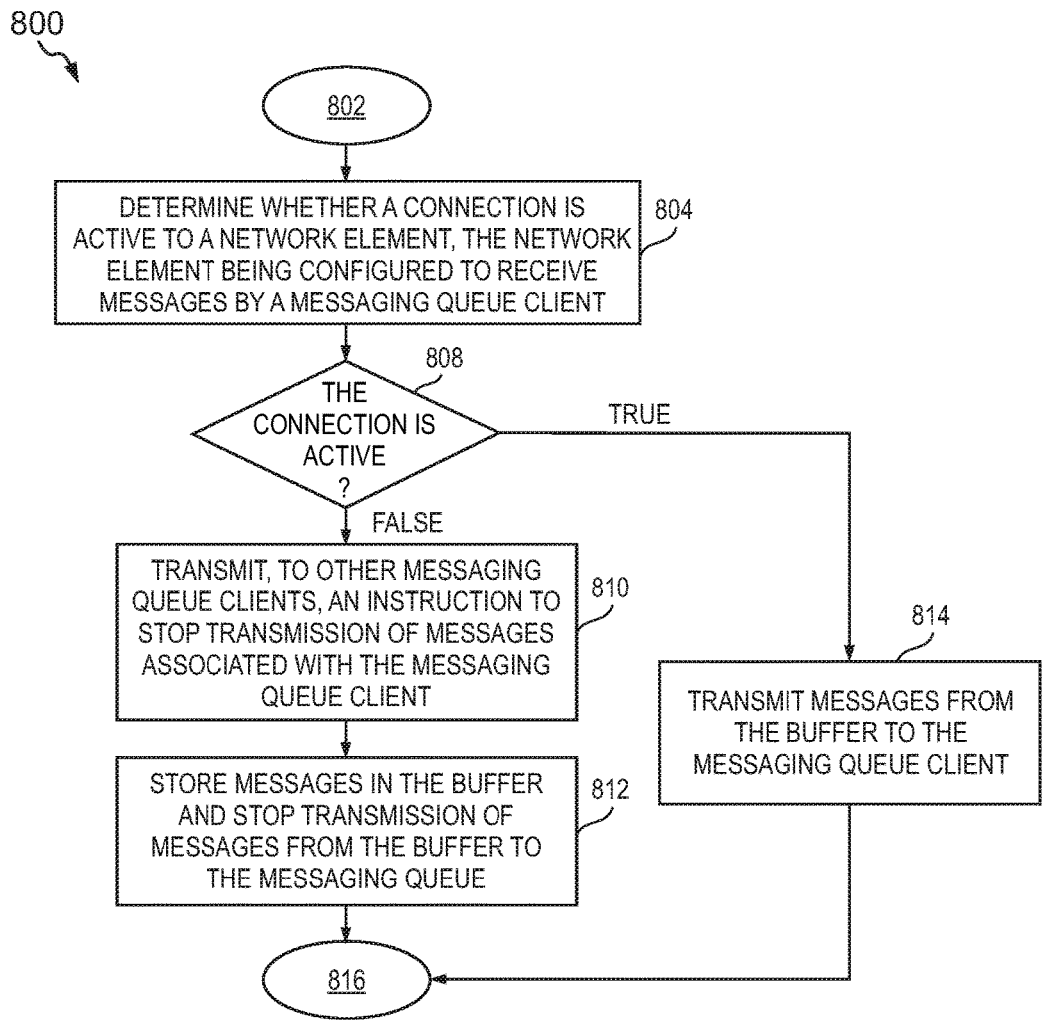
FIGS. 8 and 9 are simplified schematic diagrams illustrating an exemplary logic for distributing and/or storing messages in a message queue, in accordance with some embodiments of the present disclosure.

FIG. 8 is a simplified schematic diagram illustrating an exemplary logic (i.e., logic 800) for distributing and/or storing messages in a message queue buffer according to some embodiments of the present disclosure. Procedure 802 may coincide with a start or end point of other logic, routines, and/or applications. In addition, at 802, data (e.g., data structures, objects, values, variables, etc.) may be initialized, retrieved, or accessed for use in logic 800. At 804, it is determined whether a connection is active to a network element. The network element is configured to receive messages via a messaging queue client (e.g., a client or agent implementing a message queue protocol). In a particular example, the messaging queue client may be inclusive of the XMPP code 512 of FIG. 5. As a further example, a server may determine whether a network element (e.g., similar to network element 402 of FIG. 4) is reachable over a communication channel. When it is determined that the connection is not active to the network element (e.g., the connection is 'down') (by advancing from 808 to 810), an instruction to stop transmission of messages associated with the message queue client is transmitted to other message queue clients. For example, when the communication channel is broken, a server may instruct other data centers to stop transmitting to the server messages associated with the network element (with which the connection is broker). This instruction advantageously prevents the server from being overloaded with messages that are not transmittable to their destination (since the connection to the destination is not active). At 812, messages are stored in a buffer and transmission of messages to the message queue client is stopped. Since the connection is unavailable, the sever stops sending messages to the network element and stores the message in a buffer associated with the server. When it is determined that the connection is active to the network element (e.g., the connection is 'up') at 814, messages are transmitted to the message queue client from the buffer. The server, may repeatedly transmit messages from the buffer to the message queue client to clear the buffer of messages associated with the message queue client. In addition, an instruction to resume transmission of messages associated with the message queue client may be transmitted to the other message queue clients. The logic 800 ends at 816. However, in other embodiments, the logic 800 may loop from 816 back to 804 to determine whether the connection is active. The loop enables periodically checking whether the connection is available to toggle between storing messages in the buffer and transmitting messages from the buffer based on the availability of the connection. 816 may coincide with a start or end point of other logic, routines, and/or applications.

At a high level, the logic 800 may be used to buffer messages based on parameters associated with a network element. In the example, of logic 800, the parameter related to whether a connection is active to the network element. The logic 800 is equally applicable to other parameters for determining when to buffer messages associated with the network element. Logic 800 may be implemented in a server such as XMPP server 302 (of FIG. 3), server 502 (of FIG. 5), and/or XMPP server 1004 (of FIGS. 10A and 10B). For example, a processor (in the XMPP server 1004 of FIGS. 10A and 10B) may execute logic 800 to buffer messages for the network element 1002 (as described below with respect to FIGS. 10A and 10B). As another example, the processor 504 (in server 502 of FIG. 5) may execute logic 800 to buffer messages for a network element. Advantageously, a server can use the logic 800 to buffer messages across multiple data centers, even when the data centers do not store messages using a same message queue protocol.

Figure 9:
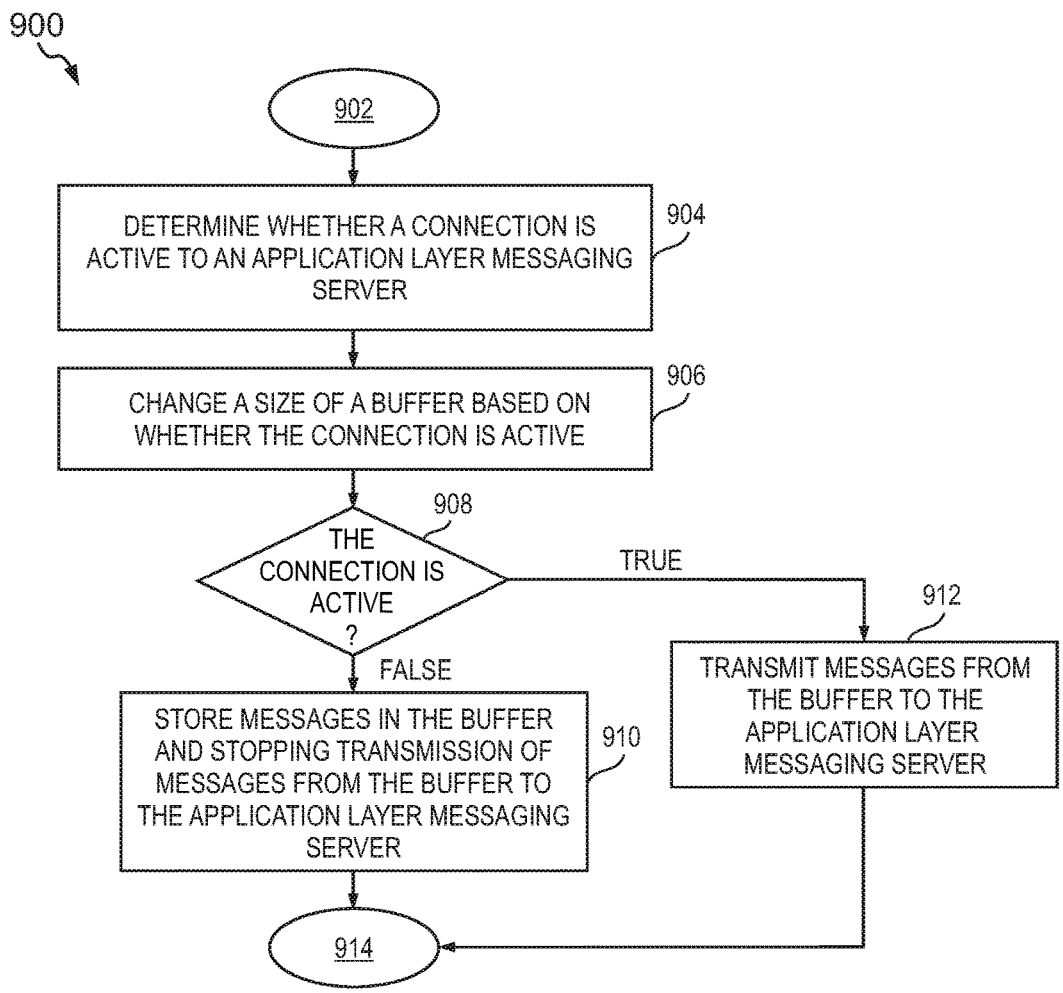

FIG. 9 is a simplified schematic diagram illustrating another exemplary logic (i.e., logic 900) for distributing and/or storing messages in a message queue buffer according to some embodiments of the present disclosure. Procedure 902 may coincide with a start or end point of other logic, routines, and/or applications. In addition, at 902, data (e.g., data structures, objects, values, variables, etc.) may be initialized, retrieved, or accessed for use in logic 900. At 904, it is determined whether a connection is active to an application-layer messaging server (the "server"). The server is configured to receive messages via an application layer messaging agent. In a particular example, the application layer messaging agent is inclusive of the XMPP code 512 in the server 502 of FIG. 5. In some examples, a network element may determine whether the server is reachable over a communication channel. In some examples, the determination may be based on failure of a connection directly with the server. In other examples, the determination may be based on receipt of an instruction to stop transmission of messages associated with another message queue client. At 906, a size of a buffer is changed based on whether the connection is active. For example, when the connection is not active, the size of the buffer may be increased to allow space for buffering messages that (if the connection were available) would be sent to the server. For example, a network element may dynamically change the size of its buffer to enable buffering messages until the connection is again available. When the connection is active, the size of the buffer may be decreased (e.g., after transmission of the stored messages to the server). The size of the buffer may be changed based on any parameter (as is described further below) and is not limited to changing based on whether the connection is active. When it is determined that the connection is not active to the server (e.g., the connection is 'down') (advancing from 908 to 910), messages are stored in the buffer and transmission of messages to the server is stopped. Since the connection is unavailable, the network element stops sending messages to the server and stores the message in a buffer associated with the network element. When it is determined that the connection is active to the server (e.g., the connection is 'up') at 914, messages are transmitted from the buffer to the server. The network element, may repeatedly transmit messages from the buffer to the server to clear it of messages stored during the loss of connection. The storing of messages advantageously prevents the server from being overloaded with messages that are not transmittable to their destination. The logic 900 ends at 914. However, in other embodiments, the logic 900 may loop from 914 back to 904 to determine whether the connection is active. The loop enables periodically checking whether the connection is available to toggle between storing messages in the buffer and transmitting messages from the buffer based on the availability of the connection. 816 may coincide with a start or end point of other logic, routines, and/or applications.

The size of the buffer may be changed (at 906 in logic 900) based on any parameter. For example, the parameters may include CPU usage (e.g., where the buffer is increased if the CPU usage of a device is elevated above a certain threshold, e.g., to buffer message in the event that the device fails/crashes), memory (e.g., where the buffer is adjusted based on the available memory on the device such as the buffer 422 being increased in the available memory is below a threshold), disk (if the system flushes to disk), network congestion, whether a connection is available from/to device and/or based on events detected at the device remote from the network element. Another parameter may include response times need to communicate with the server. A slower server (e.g., longer response time) may require larger buffer sizes (increasing the buffer size). The buffer size may be increased proportional to the time required, per message, to communicate with the server. Thus, the size of the buffer may be dynamically determined and, therefore, the buffers size would change based on how the communication times (e.g., the speed at which the server responds) change over time. In particular, the speed at which the server responds may depend on factors including, e.g., (1) network communication speeds between the originating network element and target server, (2) a load on the target server in terms of other activities and interactions it faces, which may lead to network congestion, and/or (3) performance of the infrastructure components of the system (hypervisor/cloud system performance, CPU/Memory system performance, disk and network performance). Consequently, the buffer size may fluctuate based on the same factors. Another parameter may be a time period. For example, a scheduled (planned) maintenance activity on the server may lead it to be temporarily decommissioned (and offline). The server may be notified of this planned downtime duration. The server may notify network element of the time period during which it will be offline (in advance of the time period). In this case, for the duration of maintenance, the buffer size on the network elements may be increased proportional to the time period of the maintenance (e.g., longer duration of times correspond to higher buffer sizes while shorter duration of times correspond to lower buffer sizes). In each case, the buffer may be resized to a previous (or default) size when the parameter(s) that caused the change in the buffer size is not longer detected.

Figure 10A:
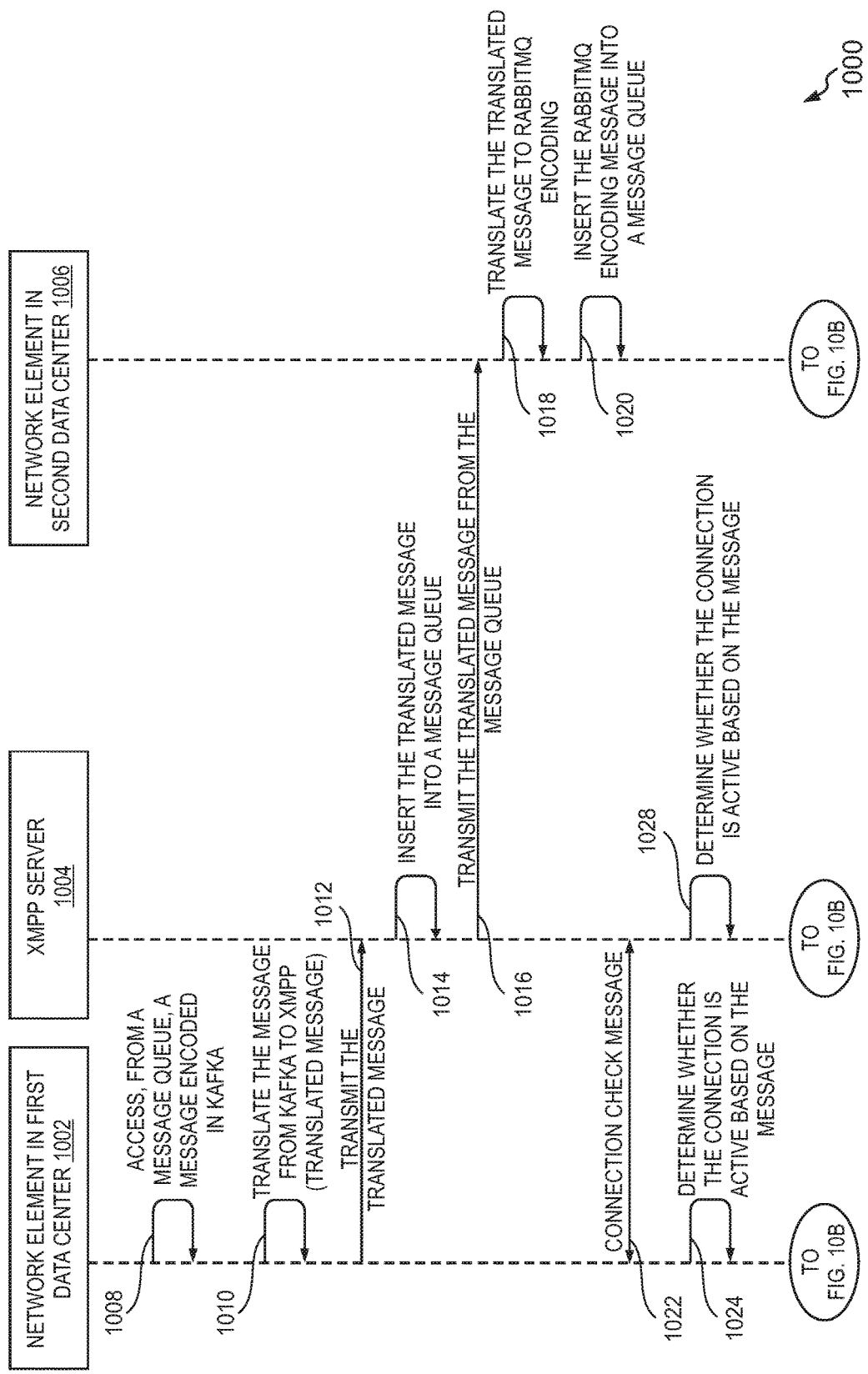
FIGS. 10A and 10B are simplified diagrams of a system for, among other things, exchanging of messages between message queues across multiple data centers and multiple message queue protocols, in accordance with some embodiments of the present disclosure.
Figure 10B:
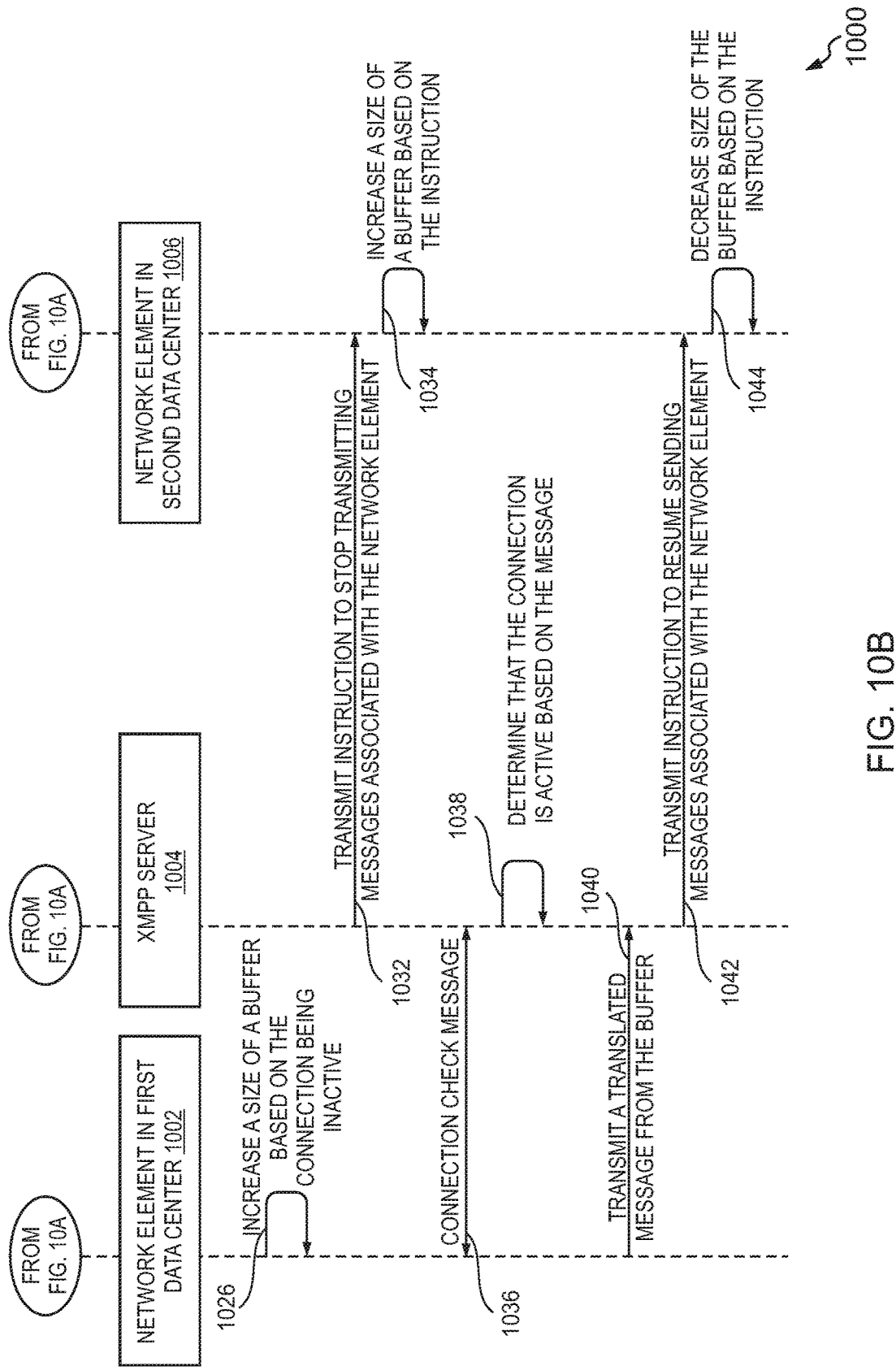

FIGS. 10A and 10B are simplified diagrams of a system (i.e., system 1000) for, among other things, exchanging of messages between message queues across multiple data centers and multiple message queue protocols. The system 1000 comprises a network element 1002 in a first data center (i.e., a first network element), a XMPP server 1004 (i.e., an application-layer messaging server), and a network element 1006 in a second data center (i.e., a second network element). The details (e.g., components and operation) of the network elements and servers are described throughout the present disclosure and are not repeated here only for the purpose of brevity and clarity of the figures.

Turning to FIG. 10A, the first network element 1002 accesses, from a message queue, a message encoded in Kafka (i.e., a first message queue protocol) at 1008. At 1010, the first network element 1002 translates the message from Kafka to XMPP (i.e., an application layer messaging protocol) to generate a translated message (e.g., using logic 600). At 1012, the first network element 1002 transmits the translated message (in XMPP encoding) to the XMPP server 1004. At 1014, the XM PP server 1004 inserts the translated message in a local message queue (i.e., an XM PP message queue). At 1016, the XMPP server 1004 transmits the translated message (in XMPP encoding) to the second network element 1006. At 1018, the second first network element 1006 translates the translated message from XMPP to RabbitMQ (i.e., a second message queue protocol). At 1020, the second network element 1006 inserts the RabbitMQ message into a message queue (i.e., a RabbitMQ message queue). The second network element 1006 may use a RabbitMQ interface (i.e., a protocol-dependent interface) to insert the RabbitMQ message the RabbitMQ message queue. The above process (e.g., 1008-1020) may also occur in the reverse (i.e., where messages originate in the second network element 1006 and are transmitted via the XMPP server 1004 to the first network element 1002. Each of the first network element 1002 and the second network element 1006 may implement logic 600 and/or 700 to perform the message translations required for such messaging between the first and second data centers.

At another point in time (and while message are still being passed between the network element 1002 and 1006), at 1022, the first network element 1002 checks the connection to the XMPP server 1004 using a message (e.g., a ping). At 1022, the XMPP server 1004 may check the connection to the first network element 1002 using a message (e.g., a ping). Thus, either device may check on the other. At 1024, the first network element 1002 determines whether the connection (to the server 1004) is active. At 1028, the XMPP server 1004 determines whether the connection (to the first network element 1002) is active. In this case, only as an example, both the first network element 1002 and the XMPP server 1004 determine that the connection is inactive.

Turning to FIG. 10B, at 1026, the first network element 1002 increases a size of a buffer (local to the network element 1002) based on the connection being inactive (e.g., disabled, not functioning, not operable to transmit message). The increased buffer gives the first network element 1002 capacity to buffer messages for the XMPP server 1004 while the connection to the XMPP server 1004 is inactive. The first network element 1002 may begin storing messages in the buffer. At 1032, the XMPP server 1004 transmits, to the second network element 1006, an instruction to stop transmission of messages associated with the first network element 1002 (e.g., based on the determination that the connection to the first network element 1002 is inactive). The second network element 1006 receives the instruction from the XMPP server 1004. At 1034, the second network element 1006 increases a size of a buffer (local to the network element 1006) based, at least in part, on the instruction received at 1032. The second network element 1006 may begin storing in the buffer messages associated with (to be sent to) the first network element 1002.

Both the first network element 1002 and the XMPP server 1004 periodically checked the status of the connection, an example of which is illustrated at 1036. At 1038, the XMPP server 1004 detects (based on the check performed at 1036) that the connection is active with the first network element 1002. At 1040, the first network element 1002 begins transmitting messages (already translated from Kafka to XMPP) from the buffer to the XMPP server 1004. The XMPP server 1004 receives the messages from the buffer and stores and/or transmits them to the second network element 1006. In addition, at 1042, the XMPP server 1004 transmits, to second network element 1006, an instruction to resume transmission of messages associated with the first network element 1002 (e.g., based on the determination that the connection to the first network element 1002 is now active). The second network element 1006 may begin transmitting messages (already translated from RabbitMQ to XMPP) from the buffer to the XMPP server 1004 (until the buffer is clear of messages associated with the first network element 1002). At 1044, the second network element 1006 reduces the size of the buffer based, at least in part, on the instruction received at 1042.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using various protocols for migration/sharing of message queues, as potentially applied to a myriad of other architectures.

It is also important to note that the steps in the Figures illustrate only some of the possible scenarios that may be executed by, or within, the elements described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by XMPP servers, XMPP clients, interfaces, and message queues in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving from a first message queue, a message encoded in a first message queue protocol associated with the first message queue;
    generating a translated message by translating the message from the first message queue protocol to an application layer messaging protocol;
    transmitting, utilizing the application layer messaging protocol, the translated message to a server, the translated message updating a second message queue, the second message queue being encoded in a second message queue protocol; and
    determining whether a connection to the server is active, wherein,
        the message queue protocol is a first message queue protocol selected from the group consisting of Kestrel, RABBITMQ, APACHE Kafka, and ACTIVEMQ, and
        the second message queue protocol is a different message queue protocol selected from the group consisting of Kestrel, RABBITMQ, APACHE Kafka, and ACTIVEMQ.

2. The method of claim 1, further comprising:
    dynamically adjusting a size of a buffer for the first message queue based on whether the connection to the server is active.

3. The method of claim 1, further comprising:
    determining the connection to the server is active; and
    increasing a size of a buffer for the first message queue.

4. The method of claim 1, further comprising:
    receiving, from the server, an instruction to stop transmitting messages associated with the second message queue.

5. The method of claim 1, further comprising:
    determining the connection to the server is not active;
    stopping transmission of messages to the server, the messages associated with the second message queue; and
    storing the messages in a buffer until the connection to the server is active.

6. The method of claim 1, wherein the translated message by translating the message from the first message queue protocol to the application layer messaging protocol comprises:
translating the message from an APACHE Kafka message encoding to an Extensible Messaging and Presence Protocol (XMPP) message encoding.

7. The method of claim 1, further comprising:
determining the connection to the server is not active; and
decreasing a size of a buffer for the first message queue.

8. An apparatus comprising:
a network interface, the network interface being configured to receive, from a first message queue, a message encoded in a first message queue protocol associated with the first message queue;
a memory element to store code; and
at least one processor coupled to the memory element and network interface, wherein the at least one processor is to execute the code to perform operations comprising:
generating a translated message by translating the message from the first message queue protocol to an application layer messaging protocol;
transmitting, utilizing the application layer messaging protocol and the network interface, the translated message to a server, wherein the translated message is to update a second message queue encoded in a second message queue protocol; and
determining whether a connection to the server is active, wherein,
the message queue protocol is a first message queue protocol selected from the group consisting of Kestrel, RABBITMQ, APACHE Kafka, and ACTIVEMQ, and
the second message queue protocol is a different message queue protocol selected from the group consisting of Kestrel, RABBITMQ, APACHE Kafka, and ACTIVEMQ.

9. The apparatus of claim 8, further comprising:
a buffer configured to store messages, and wherein the operations further comprise:
dynamically adjusting a size of a buffer for the first message queue based on whether the connection to the server is active.

10. The apparatus of claim 8, wherein the operations further comprise:
determining the connection to the server is active; and
increasing a size of a buffer for the first message queue.

11. The apparatus of claim 8, wherein the operations further comprise:
receiving, from the server, an instruction to stop transmitting messages associated with the second message queue.

12. The apparatus of claim 8, wherein the operations further comprise:
determining the connection to the server is not active;
stopping transmission of messages to the server, the messages associated with the second message queue; and
storing the messages in a buffer until the connection to the server is active.

13. The apparatus of claim 8, wherein the generating the translated message by translating the message from the first message queue protocol to the application layer messaging protocol comprises:
translating the message from an APACHE Kafka message encoding to an Extensible Messaging and Presence Protocol (XMPP) message encoding.

14. The apparatus of claim 8, wherein the operations further comprise:
determining the connection to the server is not active; and
decreasing a size of a buffer for the first message queue.

15. A computer-readable non-transitory medium comprising instructions, that when executed by at least one processor configure the at least one processor to perform operations comprising:
receiving from a first message queue, a message encoded in a first message queue protocol associated with the first message queue;
generating a translated message by translating the message from the first message queue protocol to an application layer messaging protocol;
transmitting, utilizing the application layer messaging protocol, the translated message to a server, wherein the translated message update a second message queue, the second message queue being encoded in a second message queue protocol; and
determining whether a connection to the server is active, wherein,
the message queue protocol is a first message queue protocol selected from the group consisting of Kestrel, RABBITMQ, APACHE Kafka, and ACTIVEMQ, and
the second message queue protocol is a different message queue protocol selected from the group consisting of Kestrel, RABBITMQ, APACHE Kafka, and ACTIVEMQ.

16. The computer-readable non-transitory medium of claim 15, wherein the instructions, when executed by the at least one processor further configure the at least one processor to perform further operations comprising:
dynamically adjusting a size of a buffer for the first message queue based on whether the connection to the server is active.

17. The computer-readable non-transitory medium of claim 16, wherein the dynamically adjusting the size of the buffer for the first message queue based on whether the connection to the server is active comprises:
determining the connection to the server is active; and
increasing the size of the buffer for the first message queue.

18. The computer-readable non-transitory medium of claim 15, wherein the instructions, when executed by the at least one processor further configure the at least one processor to perform further operations comprising:
receiving, from the server, an instruction to stop transmitting messages associated with the second message queue.

19. The computer-readable non-transitory medium of claim 16, wherein the instructions, when executed by the at least one processor further configure the at least one processor to perform additional operations comprising:
determining the connection to the server is not active;
stopping transmission of messages to the server, the messages associated with the second message queue; and
storing the messages in a buffer until the connection to the server is active.

20. The computer-readable non-transitory medium of claim 15, wherein the translated message by translating the message from the first message queue protocol to the application layer messaging protocol comprises:

translating the message from an APACHE Kafka message encoding to an Extensible Messaging and Presence Protocol (XMPP) message encoding.

\* \* \* \* \*